United States Patent
Hernandez

(10) Patent No.: US 10,351,111 B2
(45) Date of Patent: Jul. 16, 2019

(54) AUTOMATIC BRAKE APPLICATION FOR ONE PEDAL DRIVING

(71) Applicant: Toyota Motor Engineering & Manufacturing North America, Inc., Erlanger, KY (US)

(72) Inventor: Mariano Hernandez, Los Angeles, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 293 days.

(21) Appl. No.: 15/493,016

(22) Filed: Apr. 20, 2017

(65) Prior Publication Data

US 2018/0304869 A1   Oct. 25, 2018

(51) Int. Cl.
| | | |
|---|---|---|
| B60T 7/22 | (2006.01) | |
| B60T 7/04 | (2006.01) | |
| B60T 8/172 | (2006.01) | |
| B60T 8/32 | (2006.01) | |

(52) U.S. Cl.
CPC ............... *B60T 7/22* (2013.01); *B60T 7/042* (2013.01); *B60T 8/172* (2013.01); *B60T 8/3205* (2013.01); *B60T 2201/022* (2013.01); *B60T 2210/36* (2013.01); *B60T 2220/02* (2013.01); *B60T 2220/04* (2013.01); *B60T 2270/604* (2013.01)

(58) Field of Classification Search
CPC . B60T 7/22; B60T 7/042; B60T 8/172; B60T 8/3205; B60T 2201/022; B60T 2210/36; B60T 2220/02; B60T 2220/04; B60T 2270/604
See application file for complete search history.

(56) References Cited

U.S. PATENT DOCUMENTS

| | | |
|---|---|---|
| 2,778,463 A | 1/1957 | Rook |
| 3,331,479 A | 7/1967 | Pascual |
| 3,513,925 A | 5/1970 | Figura |
| 5,086,891 A | 2/1992 | Rinder |
| 6,480,779 B2 | 11/2002 | Mardberg |

(Continued)

FOREIGN PATENT DOCUMENTS

| | | |
|---|---|---|
| CN | 104442383 | 3/2015 |
| DE | 2420525 | 11/1974 |

(Continued)

OTHER PUBLICATIONS

Nilsson, Rickard; "*Evaluation of a combined brake-accelerator pedal*"; Accident Analysis & Prevention, vol. 34, Issue 2, Mar. 2002; pp. 175-183; (9 pages).

*Primary Examiner* — Calvin Cheung
(74) *Attorney, Agent, or Firm* — Snell & Wilmer LLP

(57) ABSTRACT

Methods, systems, and apparatus for controlling the braking of a vehicle. The brake control system includes a first sensor for detecting motion data of the vehicle and an electronic control unit connected to the first sensor. The electronic control unit is configured to determine that the vehicle is not in motion based on the motion data. The electronic control unit is configured to predict a brake application event that requires application of a braking force to prevent the vehicle from moving and cause brakes of the vehicle to apply the braking force to prevent the vehicle from moving based on the brake application event.

20 Claims, 5 Drawing Sheets

(56) References Cited

U.S. PATENT DOCUMENTS

| | | |
|---|---|---|
| 7,188,546 B2 | 3/2007 | Olofsson |
| 7,209,821 B2 | 4/2007 | Minowa et al. |
| 8,005,588 B2 | 8/2011 | Dower |
| 8,401,733 B2 | 3/2013 | Weslati et al. |
| 2017/0043767 A1* | 2/2017 | Khafagy ............... B60W 10/06 |

FOREIGN PATENT DOCUMENTS

| | | |
|---|---|---|
| DE | 10118436 | 10/2002 |
| GB | 2104463 | 3/1983 |
| JP | 58012836 | 1/1983 |

* cited by examiner

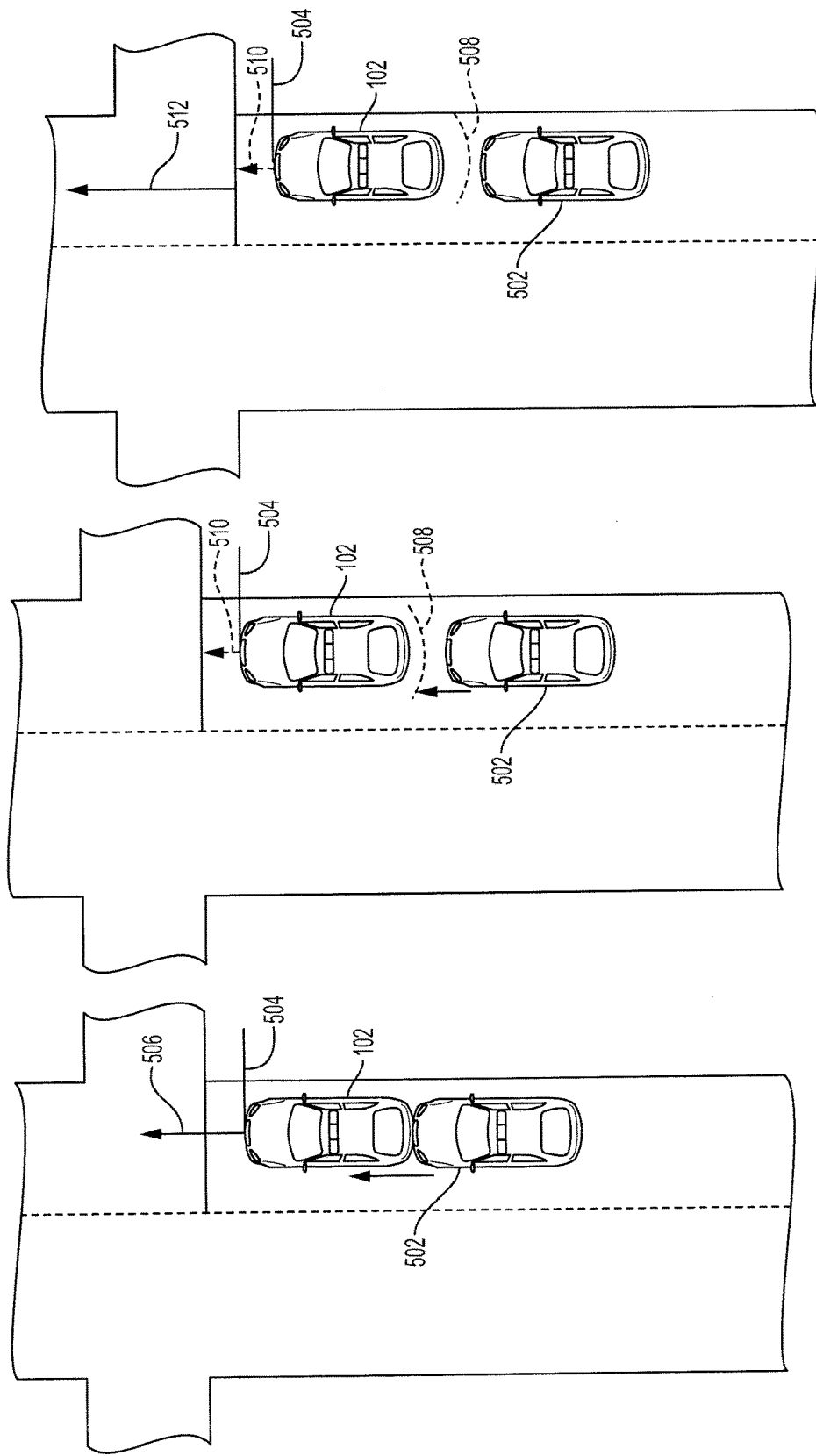

AUTOMATIC BRAKE APPLICATION FOR ONE PEDAL DRIVING

BACKGROUND

1. Field

This invention relates to a system and a method for automatically controlling the brakes when the vehicle is at a rest.

2. Description of the Related Art

Vehicles can come to a rest or stay at rest without a driver having to depress the brake pedals to initiate and/or employ the friction and/or hydraulic brakes. For example, the vehicle may remain at rest and/or motionless when a driver completely stops the vehicle and releases the brake pedal and/or shifts the vehicle into neutral. In another example, the vehicle may slow to a stop. In another example, the vehicle may be an electric vehicle or a hybrid vehicle that utilizes one pedal driving. In one pedal driving, a driver depresses the accelerator pedal to accelerate the vehicle and releases the accelerator pedal to slow the vehicle to a stop using regenerative braking. One pedal driving does not require the driver to depress the brakes to slow and/or stop the vehicle. Instead, one pedal driving employs the regenerative brakes to slow and/or stop the vehicle when the driver releases the accelerator pedal and/or is applying the accelerator pedal with a predetermined amount or within a predetermined range of pressure. If the vehicle is unexpectedly impacted by another vehicle when the vehicle is at rest, the vehicle may unintentionally move which potentially results in harm to occupants of the vehicle, as a result of the driver failing to engage the friction and/or hydraulic brakes.

Accordingly, there is a need for a system and a method for automatically employing the friction and/or hydraulic brakes of a vehicle when the vehicle is at rest and motionless when the driver is not depressing the brake pedal to engage the friction and/or hydraulic brakes.

SUMMARY

In general, one aspect of the subject matter described in this specification is embodied in a brake control system for a vehicle. The brake control system includes a first sensor for detecting motion data of the vehicle and an electronic control unit connected to the first sensor. The electronic control unit is configured to determine that the vehicle is not in motion based on the motion data. The electronic control unit is configured to predict a brake application event that requires application of a braking force to prevent the vehicle from moving and cause brakes of the vehicle to apply the braking force to prevent the vehicle from moving based on the brake application event.

These and other embodiments may optionally include one or more of the following features. The brake control system may include a user interface for displaying a user indicator. The electronic control unit may be connected to the user interface and may be configured to display the user indicator that indicates that the brakes of the vehicle are being applied in response to the braking force being applied without depression of the brake pedal of the vehicle. The electronic control unit may be configured to automatically cause the brakes of the vehicle to apply the braking force without depression of a brake pedal of the vehicle.

The brake control system may include a second sensor for obtaining sensor data of an external environment surrounding the vehicle. The electronic control unit may be configured to obtain, from the second sensor, the sensor data, and predict the brake application event based on the sensor data. The sensor data may include a distance between another vehicle and the vehicle. The electronic control unit may be configured to predict the brake application event if the distance between the other vehicle and the vehicle is less than a threshold distance that indicates that the another vehicle will impact the vehicle. The electronic control unit may be configured to cause the brakes of the vehicle to apply the braking force in response to the prediction.

The brake control system may include a second sensor for identifying a driver of the vehicle. The brake control system may include a memory configured to store driving behavior patterns for the driver including an amount of pressure applied to the brakes of the vehicle. The amount of braking of braking force applied to prevent the vehicle from moving may be based on the stored driving behavior patterns for the driver. The brake control system may include an acceleration input sensor for obtaining additional acceleration data. The electronic control unit may be configured to obtain, from the acceleration input sensor, additional acceleration data that indicates that pressure is being applied to the accelerator pedal. The electronic control may be configured to override the brake application event, cause the brakes of the vehicle to release, and apply an acceleration force to move the vehicle.

The brake control system may include a braking sensor for detecting an amount of depression to a brake pedal of the vehicle or an amount of friction or hydraulic braking being applied. The electronic control unit may be configured to obtain the amount of depression of the brake pedal or the amount of friction or hydraulic braking being applied. The electronic control unit may determine that the brakes of the vehicle are not currently being applied based on the amount of depression of the brake pedal.

In another aspect, the subject matter is embodied in a brake control system for a vehicle. The brake control system includes a brake sensor for detecting friction braking data including an indication of whether a brake pedal of the vehicle is depressed. The brake control system includes at least one of a navigation unit or a first sensor for detecting vehicle data. The electronic control unit is configured to obtain, from the brake sensor, braking data, and determine that the brake pedal of the vehicle is not depressed based on the braking data. The electronic control unit is configured to determine that the vehicle is not in motion based on the vehicle data, and automatically cause brakes of the vehicle to apply a braking force to prevent the vehicle from moving.

In another aspect, the subject matter is embodied in a method for controlling braking of the vehicle. The method includes obtaining, from at least one of a navigation unit or a first sensor, movement information. The method includes determining, by an electronic control unit, which the vehicle is stationary based on the movement information. The method includes determining, by the electronic control unit, that there is a brake application event that requires application of a braking force to prevent the vehicle from moving. The method includes controlling, by the electronic control unit, brakes of the vehicle to apply the braking force.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 5A-5C show example illustrations of use cases of when the brake control system of FIG. 1 may be used to engage the friction and/or hydraulic brakes according to an aspect of the invention.

DETAILED DESCRIPTION

Disclosed herein are systems, vehicles and methods for automatically controlling the brakes to prevent movement of the vehicle without the need for the driver to depress the brake pedal. Particular embodiments of the subject matter described in this specification may be implemented to realize one or more of the following advantages. A brake control system automatically engages and/or operates the brakes when the vehicle is not in motion so that the brakes are engaged if there is a brake application event, such as when the vehicle is impacted by another vehicle. By automatically engaging the brakes when the vehicle is not in motion, the brakes are engaged and resist movement to the vehicle without the driver having to depress the brake pedal. This prevents movement of the vehicle and/or provides more resistance against movement to the vehicle when the vehicle is at rest or stopped without the need for the driver to depress the brake pedal. Moreover, automatically engaging the brakes eliminates the response time required for the driver to transition to depress the brake pedal when a collision is imminent.

Other benefits and advantages include disengaging the brakes when overridden by the driver. By disengaging the brakes when the driver overrides the brake acceleration event, the brake control system may provide additional vehicle control. For example, if the vehicle is stopped or at rest at a stop sign and another vehicle impacts the vehicle, the brake control system may engage the brakes to prevent the vehicle from being pushed into the intersection. However, if the vehicle is forced into the intersection, the driver may depress the accelerator pedal to release the brakes and travel through the intersection to prevent from stalling in the middle of the intersection.

Additionally, the brake control system may tune the control of the brakes to each individual driver to apply a pressure that the individual driver is accustomed to when applying the brakes.

Figure 1:
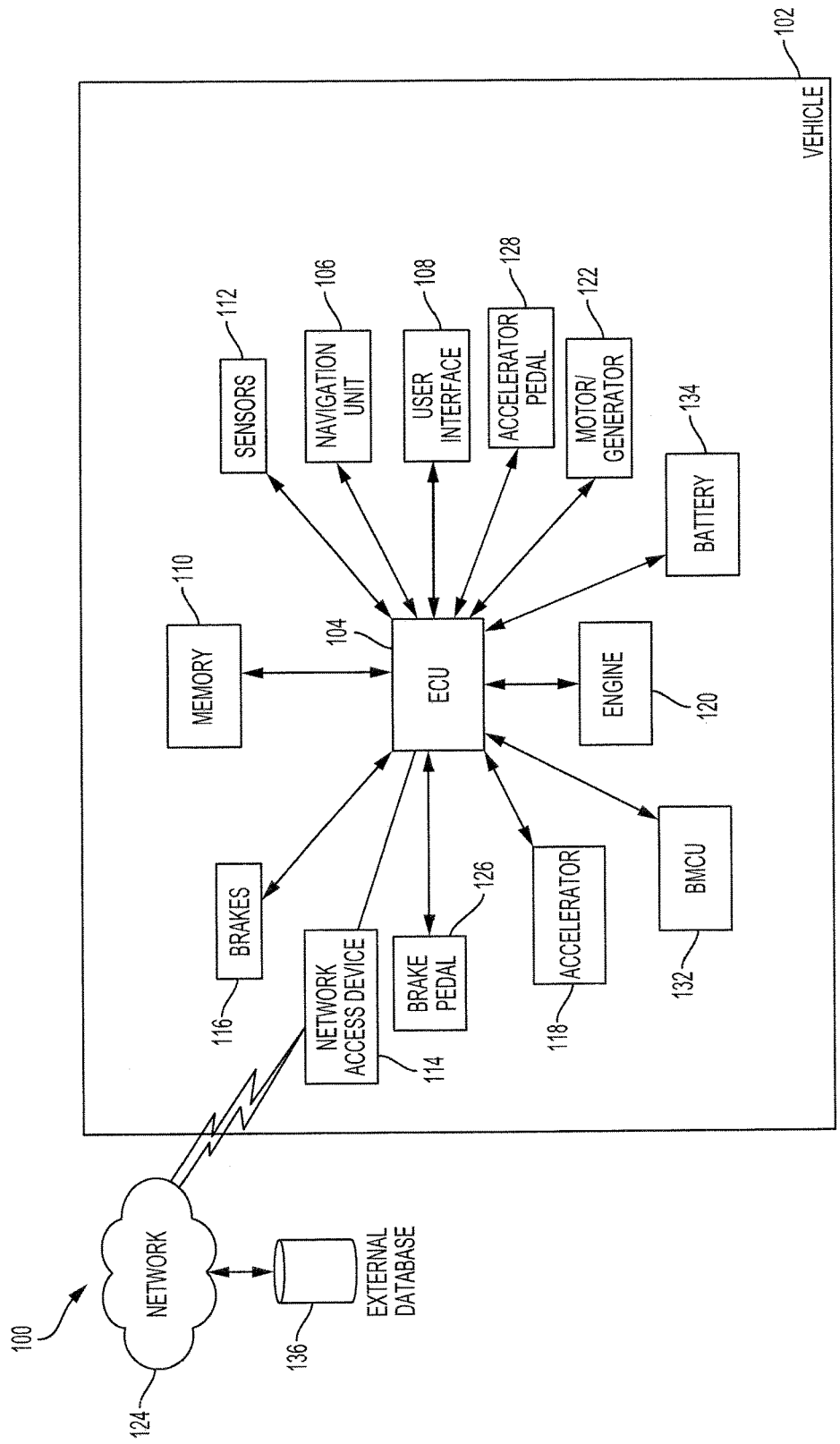
FIG. 1 is a block diagram of an example brake control system for a vehicle according to an aspect of the invention.

FIG. 1 is a block diagram of an example brake control system 100 for a vehicle 102. The brake control system 100 includes one or more computers or electronic control units (ECUs) 104, appropriately programmed, to control the brakes 116 of the vehicle 102. The brake control system 100 may include one or more sensors 112, a navigation unit 106, a user interface 108, and a memory 110. The brake control system 100 may automatically apply, engage, employ, disengage or otherwise control the brakes 116. The brakes 116 may include the brake pedal 126, one or more cylinders and/or the drum and/or disc brakes. The accelerator 118 may include the accelerator pedal 128 and/or the throttle.

The brake control system 100 may be included in a vehicle 102 and connected to a network 124 that may assist in communicating with one or more sensors 112, the external databases 130 or other components of the brake control system 100. A vehicle 102 is a conveyance capable of transporting a person, an object, or a permanently or temporarily affixed apparatus. A vehicle 102 may be a self-propelled wheeled conveyance, such as a car, sports utility vehicle, truck, bus, van or other motor or battery driven vehicle. For example, the vehicle 102 may be an electric vehicle, a hybrid vehicle, a plug-in hybrid vehicle or any other type of vehicle that includes a motor and/or a generator 122. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may use one or more sensors 112 and/or navigation unit 106 to drive autonomously. The vehicle 102 may employ one-pedal driving. One-pedal driving does not require the use of the vehicle's friction brakes to stop or slow the vehicle 102. One-pedal driving allows the driver of the vehicle 102 to rely completely on the regenerative brakes to bring the vehicle 102 to a stop. The driver may ease off the accelerator pedal 128, activating a user interface element and/or a combination of both to employ the regenerative brakes.

The vehicle 102 may be coupled to a network 124. The network 124, such as a local area network (LAN), a wide area network (WAN), a cellular network, a digital short-range communication (DSRC), the Internet, or a combination thereof, connects the vehicle 102, one or more external databases 130 and/or components of the brake control system 100. The external databases 130 may include databases from different service providers. A service provider may provide navigational map, weather and/or traffic condition information to the vehicle 102.

A database is any collection of pieces of information that is organized for search and retrieval, such as by a computer, and the database may be organized in tables, schemas, queries, report, or any other data structures. A database may use any number of database management systems. An external database 130 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

Navigational map information may include a route that the vehicle 102 intends to travel. The route may include a starting location, a destination location and a path between the starting location and the destination location. The navigational map information may include terrain, political, traffic condition, roadway and/or construction information along the route. Political information includes political features such as cities, states, zoning ordinances, and laws and regulations, and traffic signs. Roadway information includes road features such the grade of an incline of a road and/or the boundaries of one or more lanes that make up the roadway. Construction information includes construction features such as construction zones and construction hazards. Traffic condition information includes one or more traffic condition features, such as a stop sign, traffic signal, traffic congested areas or accident areas. The traffic condition information may provide information related to the density and movement of vehicles on a roadway and/or accident locations. Traffic condition information may include real-time information of the traffic congested areas or accident areas. The real-time information may include the traffic in a particular lane. Terrain information may include terrain features, such as hills, flat terrains, or curves, and/or topographical information.

Features, e.g., terrain features, road features, political features, or traffic condition features, which may be derived from the terrain, roadway, political or traffic condition information, each have a location that may be identified by map coordinates. The map coordinates may be defined by latitude and longitudinal coordinates.

The vehicle 102 may include an engine 120, a motor and/or a generator 122, a battery 134 and a battery management and control unit (BMCU) 132. The motor and/or the generator 122 may be an electric motor and an electric generator that converts electrical energy into mechanical power, such as torque, and converts mechanical power into electrical energy. The motor and/or the generator 122 may be coupled to the battery 134. The motor and/or the generator 122 may convert the energy from the battery 134 into mechanical power, and may provide energy back to the battery 134, for example, via regenerative braking. The engine 120 combusts fuel to provide power instead of and/or in addition to the power supplied by the motor and/or the generator 122. The vehicle 102 may include brakes 116 for slowing and/or stopping the vehicle 102 and an accelerator 118 to open a throttle valve of the engine 120 to cause the vehicle 102 to move.

The battery 134 may be coupled to the motor and/or the generator 122 and may provide electrical energy to and receive electrical energy from the motor and/or the generator 122. The battery 134 may include one or more rechargeable batteries.

The BMCU 132 may be coupled to the battery 134 and control and manage the charging and discharging of the battery 134. The BMCU 132, for example, may measure, using battery sensors (not shown), parameters used to determine the state of charge (SOC) of the battery 134.

The one or more ECUs 104 may be implemented as a single ECU or in multiple ECUs. The ECU 104 may be electrically coupled to some or all of the components of the vehicle 102. The ECU 104 may be coupled to at least one of the navigation unit 106, the one or more sensors 112, the network access device 114 and/or the memory 110. The ECU 104 may include one or more processors or controllers specifically designed for controlling the brakes 116, such as injecting fluid into the cylinders to cause the vehicle 102 to brake.

The memory 110 may be coupled to the ECU 104. The memory 110 may store instructions to execute on the ECU 104 and may include one or more of a RAM or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 104. The memory 110 may store driver profiles that include driving behavior patterns of a driver. The driving behavior patterns of a driver may include braking data and/or acceleration data. The braking data includes an average rate or an amount of depression of the brake pedal by a driver when braking on a previously-travelled route. The acceleration data includes an average rate or an amount of depression of the accelerator pedal 128 by a driver when accelerating on a previously-travelled route.

The network access device 114 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 114 may transmit data to and receive data from devices and systems not directly connected to the vehicle 102. For example, the ECU 104 may communicate with the external databases 130. Furthermore, the network access device 114 may access the network 124, to which the external databases 130 are also connected.

The one or more sensors 112 may be coupled to the ECU 104 and include a motion sensor, a vehicle speed sensor, an acceleration input sensor, a brake sensor, and/or one or more proximity sensors. The motion sensor measures the motion of the vehicle 102. The motion sensor may be an accelerometer, gyroscope, inertia measurement unit or other motion sensing device. The vehicle speed sensor measures the speed of the vehicle 102, for example, by measuring the total revolutions of the wheel per minute. The brake sensor measures the amount and/or rate of pressure applied to the brake pedal 126. The acceleration input sensor measures the amount and/or rate of pressure applied to the accelerator pedal 128. The one or more proximity sensors may be positioned on the front and/or rear of the vehicle 102 to detect surrounding vehicles and/or objects that are within a threshold distance of the vehicle 102 in the front and/or back of the vehicle 102, respectively. The proximity sensor may use a radar, a camera, vehicle-to-vehicle (V2V) communication or other means to detect and/or measure a distance to the other vehicles or objects. The one or more sensors 112 may include one or more cameras that may be used to identify a driver to determine a driver profile to be used as baseline for the driver behavior patterns.

The navigation unit 106 may be coupled to the ECU 104 and provide vehicle information and/or navigational map information to the ECU 104. The navigation unit 106 may have or be connected to a Global Positioning System (GPS) device. The vehicle information may include the current position, location, direction and/or speed of the vehicle 102.

Figure 2:
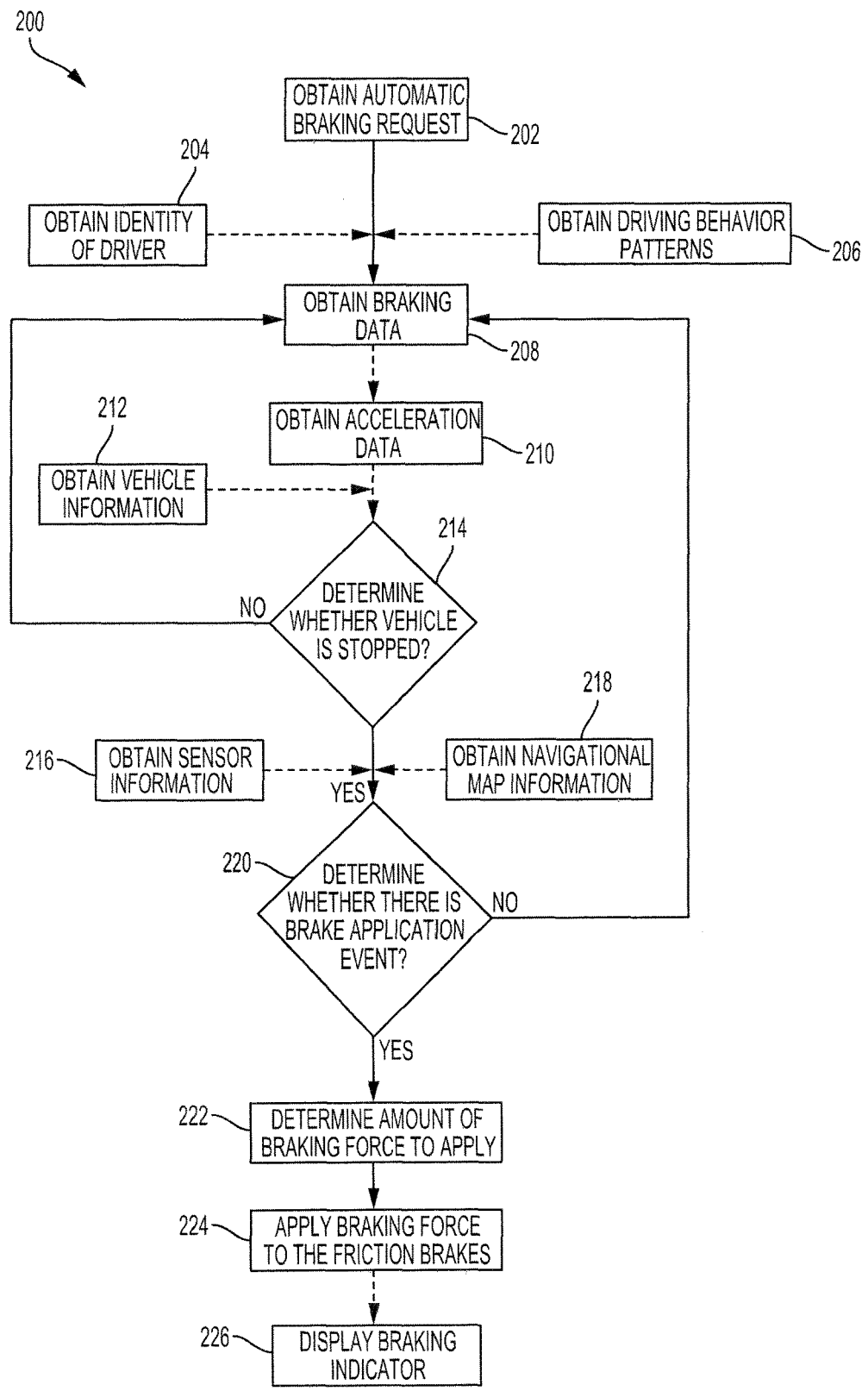
FIG. 2 is a flow diagram of an example process for automatically employing and/or engaging the brakes according to an aspect of the invention.

FIG. 2 is a flow diagram of an example process 200 for automatically employing and/or engaging the brakes 116. One or more computers or one or more data processing apparatuses, for example, the ECU 104 of the brake control system 100 of FIG. 1, appropriately programmed, may implement the process 200.

The brake control system 100 obtains an automatic braking request (202). The automatic braking request is a request to initialize the brake control system 100. The brake control system 100 receives the automatic braking request when the vehicle 102 becomes operational or when an occupant of the vehicle 102 activates the brake control system 100, e.g., through a user interface 108.

The brake control system 100 may receive the automatic braking request from one or more sensors 112, such as an engine sensor, when the vehicle 102 is powered on. The pedal change prediction system 100 may receive the automatic braking request upon user activation, for example, when a token, such as a key, is inserted to start the vehicle 102. When the brake control system 100 is initialized, the brake control system 100 may display an indicator on the user interface 108 to indicate to the driver that the brake control system 100 is initialized.

The brake control system 100 may determine an identity of a driver during initialization (204). The automatic braking request may include the identity of the driver. The brake control system 100 may receive user input, such as a user identification token, a user identification code or a fingerprint, which identifies the driver, to determine the identity of the driver. For example, a driver's key fob may uniquely identify the driver when the driver opens the door or is within proximity of the vehicle 102. In another example, the brake control system 100 may obtain a user identification from the driver, using the user interface 108, to identify the driver. The brake control system 100 may use other user interface elements, such as a memory button that configures the position of a mirror or a seat, other sensors, such as a camera that uses facial recognition, or a combination of devices and/or techniques to identify the driver of the vehicle 102. The identity of the driver may be associated with driver behavior patterns that are stored in the memory 110.

The brake control system 100 may obtain the driving behavior patterns of the driver (206). The memory 110 may have an internal database that associates the identity of the driver with previously stored driver behavior patterns using, for example, a driver profile. The brake control system 100 may provide the identity of the driver to the internal database and receive the previously stored driver behavior patterns associated with the identity of the driver. The driver behavior patterns may include an average rate or an amount of depression for the brake pedal 126 and/or an average rate or an amount of depression for the accelerator pedal 128 for the identified driver. The average rate or the amount of depression may be an average rate or an amount of pressure being applied to the brake pedal 126 and/or the accelerator pedal 128, respectively. The previously stored driver behavior patterns may be recorded and stored on a previously-travelled route that the driver traversed using the vehicle 102. A statistical average of the rate or the amount of depression for the brake pedal 126 and/or a statistical average of the rate of depression or the amount of depression for the accelerator pedal 128 may be stored and associated with the identified driver in the memory 110.

The brake control system 100 may obtain braking data (208). The braking data includes a rate and/or an amount of depression of the brake pedal 126 that engages the friction and/or hydraulic brakes. The braking data may include a rate and/or an amount of use of the regenerative brakes. The brake control system 100 may obtain the braking data using the one or more sensors 112. The one or more sensors 112 may include a brake sensor that measures and provides braking data including an amount and/or a rate of pressure applied or being applied to the brake pedal of the brakes 116. The brake control system 100 may obtain the amount of pressure applied to the brake pedal 126 of the brakes 116 over a period of time and calculate the change in the amount of pressure applied to the brake pedal 126 of the brakes 116 to determine the rate of depression of the brake pedal 126 of the brakes 116.

The brake control system 100 may obtain acceleration data (210). The acceleration data includes a rate of depression of the accelerator pedal 128 and/or an amount of depression of the accelerator pedal 128. The brake control system 100 may obtain the accelerator data using the one or more sensors 112. The one or more sensors 112 may include an accelerator input sensor that measures the amount and/or the rate of pressure applied to the accelerator pedal 128 of the accelerator 118. The brake control system 100 may obtain the amount of pressure applied to the accelerator pedal 128 of the accelerator 118 over a period of time and calculate the change in the amount of pressure applied to the accelerator pedal 128 of the accelerator 118 to determine the rate of depression of the accelerator pedal 128 of the accelerator 118.

The brake control system 100 may obtain vehicle information (212). The brake control system 100 may obtain the vehicle information using the navigation unit 106 and/or the one or more sensors 112. The vehicle information includes the motion, position, location, speed and/or direction of travel of the vehicle 102. The brake control system 100 may request and/or determine the position or the location of the vehicle 102 using the navigation unit 106 that may obtain the information from an external database 130 or other device connected to the network 124. The brake control system 100 may use the position and/or the location of the vehicle 102 at two different points in time to calculate the speed and/or the direction of travel of the vehicle 102. The brake control system 100 may use a sensor 112 to obtain the vehicle information. For example, an accelerometer or a gyroscope may provide an indication of whether the vehicle 102 is accelerating or otherwise in motion and/or a direction of travel of the vehicle 102. The brake control system 100 may obtain the speed of the vehicle 102 using a vehicle speed sensor.

The brake control system 100 determines whether the vehicle 102 is at rest (214). The brake control system 100 may determine whether the vehicle 102 is at rest and not in motion based on the vehicle information, the braking data and/or the acceleration data. The brake control system 100 may use a combination of the vehicle information, the braking data and/or the acceleration data to determine whether the vehicle 102 is at rest. The brake control system 100 may extract the indication of whether the vehicle 102 is accelerating or otherwise in motion from the vehicle information to determine whether the vehicle 102 is at rest and not in motion.

In some implementations, the brake control system 100 may determine whether the vehicle 102 is at rest and not in motion based on the position, the location and/or the speed of the vehicle 102. For example, if there is no change in position and/or location of the vehicle 102 over a period of time, such as 5 seconds, the brake control system 100 may determine that the vehicle 102 is at rest and not in motion. If there is a change in position and/or location over the period of time, the brake control system 100 may determine that the vehicle is in motion and not at rest. In another example, if the speed of the vehicle 102 that is detected from the vehicle speed sensor is less than or equal to a threshold value, such as 0.02 mph, the brake control system may determine that the vehicle 102 is at rest and not in motion.

The braking data includes the amount and/or the rate of depression of the brake pedal 126 which indicates when the brake pedal 126 is depressed and the vehicle 102 is braking using the friction and/or hydraulic brakes. The braking data may include the amount of regenerative brakes being used. The brake control system 100 may calculate the amount of braking force needed to stop the vehicle 102 based on the initial speed of the vehicle 102 when the brakes 116 were initiated. If the amount of braking force needed is less than the amount of braking force generated from the use of the regenerative brakes and/or depression of the brake pedal 126 based on the braking data, the brake control system 100 may determine that the vehicle 102 is at rest and has stopped.

The acceleration data includes the amount and/or the rate of depression of the accelerator pedal 128 which indicates when the accelerator pedal 128 is depressed and the vehicle 102 is accelerating. The brake control system 100 may calculate a distance or a time that elapses from when the accelerator pedal 128 is released for the vehicle 102 to slow to a stop based on the initial speed of the vehicle 102 when the accelerator 118 was released. If the time or the distance elapsed is greater than the calculated time, the brake control system 100 may determine that the vehicle is at rest and has stopped. The brake control system 100 may determine from the acceleration data that the amount and/or rate of depression of the accelerator pedal 128 is greater than or equal to a threshold amount which indicates that the vehicle 102 is accelerating and/or in motion.

In some implementations, if the vehicle 102 utilizes one-pedal driving, the brake control system 100 may determine that the vehicle 102 is slowing to a stop due to regenerative braking when the amount and/or the rate of depression of the accelerator pedal 128 is less than a threshold amount, e.g., 10% depression of the accelerator pedal 128. The brake control system 100 may determine that the vehicle 102 is stopped and at rest after a period of time. The period of time may be calculated based on the initial speed of the vehicle 102 when the vehicle 102 begins using regenerative brakes to slow the vehicle 102.

If the brake control system 100 determines that the vehicle 102 is not at rest and in motion, the brake control system 100 continues to monitor and/or obtain the braking data, the acceleration data and/or the vehicle information. If the brake control system 100 determines that the vehicle 102 is not in motion and is at rest, the brake control system 100 may proceed to determine whether there is a brake application event that requires the vehicle 102 to apply the friction and/or hydraulic brakes.

The brake control system 100 may obtain sensor information from the one or more sensors 112 (216). For example, the sensor data from a proximity sensor or camera may include information that indicates the distance between another vehicle or object and the vehicle 102. In another example, a sensor may detect traffic condition information that may be used to determine a brake application event.

The brake control system 100 may obtain navigational map information from the navigation unit (218). The navigational map information may include weather information, traffic condition information, terrain information and/or political information. The features, such as terrain features, political features and/or traffic features may be used to determine a brake acceleration event.

Figure 3:
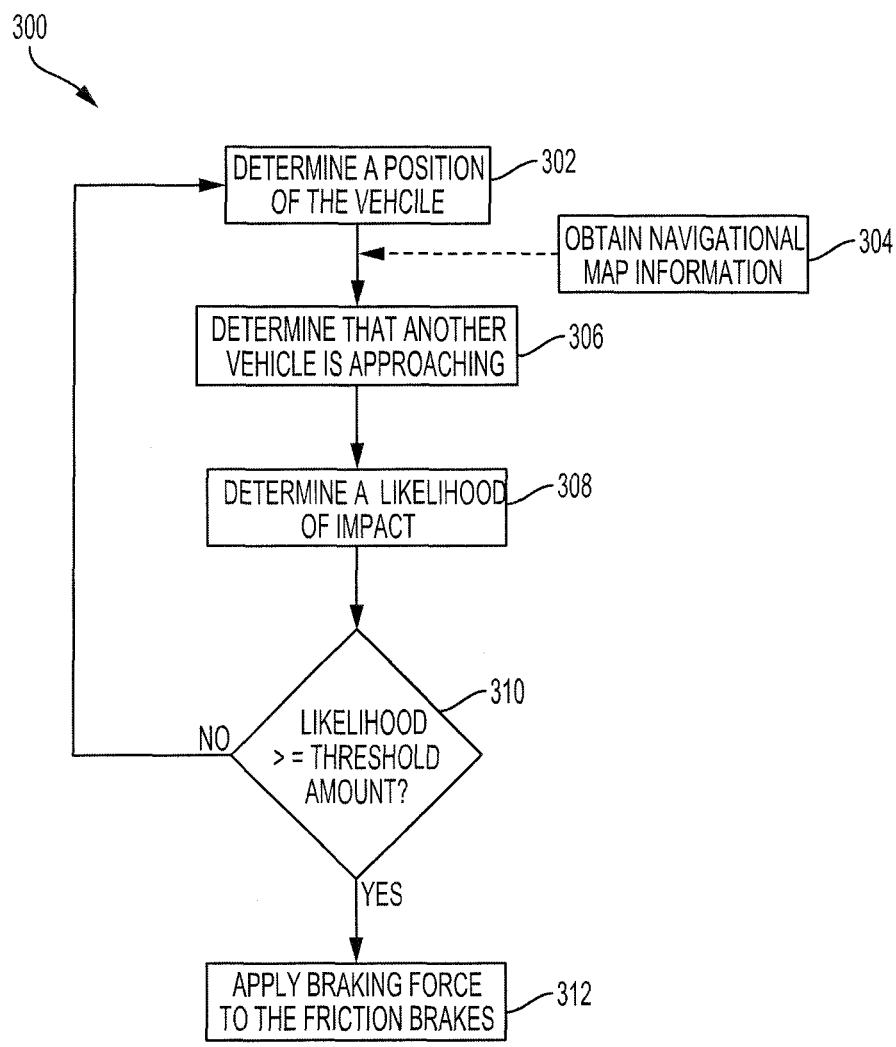
FIG. 3 is a flow diagram of an example process for determining a brake application event resulting from a potential collision according to an aspect of the invention.

The brake control system 100 may determine whether there is a brake application event based on navigational map information, such as political and/or traffic condition information, or sensor information, such as information regarding a potential collision from a proximity sensor (220). A brake application event is an event that requires use of the friction and/or hydraulic brakes to prevent the vehicle 102 from moving. Examples of a brake application event include the potential collision of another vehicle with the vehicle 102, a stop sign, and/or traffic. FIG. 3 is a flow diagram that further describes the process of determining a brake application event, such as the collision of another vehicle with the vehicle 102. The brake control system 100 may determine whether the brakes 116 are already engaged based on the braking data. If the braking data indicates that there is already an amount of depression of the brake pedal 126, the brake control system 100 may determine that there is no brake application event since the friction and/or hydraulic brakes are already in use.

The brake control system 100 determines an amount of braking force to apply to the friction and/or hydraulic brakes (222). The amount of braking force may, be a predetermined set amount, user-configurable, a maximum amount of braking force and/or learned from driver behavior patterns based on the identity of the driver. The brake control system 100 may obtain the driver behavior patterns from the memory 110 and extract the braking data including the average rate or the amount of depression of the brake pedal from the driver behavior patterns stored for the driver.

The amount may be based on the brake application event. For example, if the brake application event is a potential collision the amount of braking force applied may be the maximum amount possible, whereas, if the brake application event is a stop sign or traffic, the amount of braking force applied may be a predetermined amount or based on the driver behavior patterns of the driver. The tuning of the applied braking force reduces and/or manages the amount of wear and tear on the brakes 116.

After determining the amount of braking force to apply, the brake control system 100 automatically causes and/or applies the braking force to the friction and/or hydraulic brakes so that friction and/or hydraulic brakes resist any motion of the vehicle 102 (224). This eliminates the need for the driver to recognize that an impact has or will be occurring and transition his or her foot to depress the brake pedal 126. The brake control system 100 may cause the brake pedal to depress, push a piston into the cylinders to inject additional fluid into the cylinders or press the brake pad against the brake disc.

The brake control system 100 may be applied in response to the brake application event or may be applied when the vehicle 102 is at rest. When the brake control system 100 is applied in response to when the vehicle 102 is at rest, an additional braking force may be applied based on the brake application event. For example, the brake control system 100 may apply an initial braking force after the vehicle 102 stops and an additional braking force if the brake control system 100 detects that an impact or collision is imminent.

The brake control system 100 may display and/or activate a braking indicator that indicates that the brake control system 100 has applied the braking force to the friction and/or hydraulic brakes (226). The braking indicator may be an audio and/or visual indicator or may be an internal indicator that tracks the status of the application of the braking force to the friction and/or hydraulic brakes when the brake pedal 126 is not depressed. For example, the brake control system 100 may display the braking indicator on the user interface 108 to notify the driver that the brakes 116 are engaged when the brake pedal 126 is not depressed.

FIG. 3 is a flow diagram of an example process 300 for determining whether there is a brake application event resulting from a potential collision. One or more computers or one or more data processing apparatuses, for example, the ECU 104 of the brake control system 100 of FIG. 1, appropriately programmed, may implement the process 300.

The brake control system 100 determines a current position of the vehicle 102 when the vehicle 102 is at rest or not in motion (302). The brake control system 100 may determine the current position based on obtained vehicle information. The brake control system 100 may obtain the vehicle information using the navigation unit 106 and extract the position of the vehicle 102 from the obtained vehicle information. The brake control system 100 may obtain navigational map information, as discussed above in step 218 (304).

The brake control system 100 may determine that another vehicle is approaching the vehicle 102 (306). The brake control system 100 may use a proximity sensor to determine a distance between another vehicle and the vehicle 102. The brake control system 100 may determine the distance over a period of time and if the distance is decreasing determine that the other vehicle is approaching the vehicle 102. In some implementations, the brake control system 100 obtains vehicle information about the other vehicle from the external database 130. For example, the external database 130 may provide traffic condition information including the locations of other vehicles relative to the vehicle 102. The brake control system 100 may use the location of the other vehicles to determine a relative distance and direction of travel between the other vehicles and the vehicle 102 over a period of time to determine that another vehicle is approaching.

The brake control system 100 determines a likelihood of an impact between the approaching vehicle and the vehicle 102 (308). The likelihood of impact may be based on the relative distance between the two vehicles, the rate the relative distance between the two vehicles is decreasing and/or additional information.

The brake control system 100 analyzes the relative distance between the two vehicles and may calculate the rate the relative distance between the two vehicles is decreasing and/or increasing. If the relative distance is less than or equal to a threshold amount and/or the rate the relative distance between the two vehicles is decreasing is greater than or equal to a threshold amount, the brake control system may determine that the likelihood of impact between the two vehicles is significant or greater than or equal to a threshold amount that indicates a higher than likely chance of a collision.

The likelihood of the impact may be affected by additional information, such as time of day, weather information and/or traffic condition information. The time of day may be determined using an internal clock or obtained from the navigation unit 106. The weather information and/or traffic condition information may be extracted from the navigational map information or obtained from the one or more sensors 112 or the external database 130. For example, the likelihood of an impact increases if there is inclement weather, such as rain, snow or ice, and increases if there is more traffic in comparison to a sunny light traffic day.

The brake control system 100 determines whether the likelihood of an impact is greater than or equal to a threshold amount (310). The threshold amount may be pre-determined, user-configurable or based on a statistical analysis of vehicle collisions. If the likelihood is less than the threshold amount, the brake control system 100 continues to monitor for an approaching vehicle. If the likelihood is greater than or equal to the threshold amount, the brake control system 100 applies a braking force to the friction and/or hydraulic brakes (312).

Figure 4:
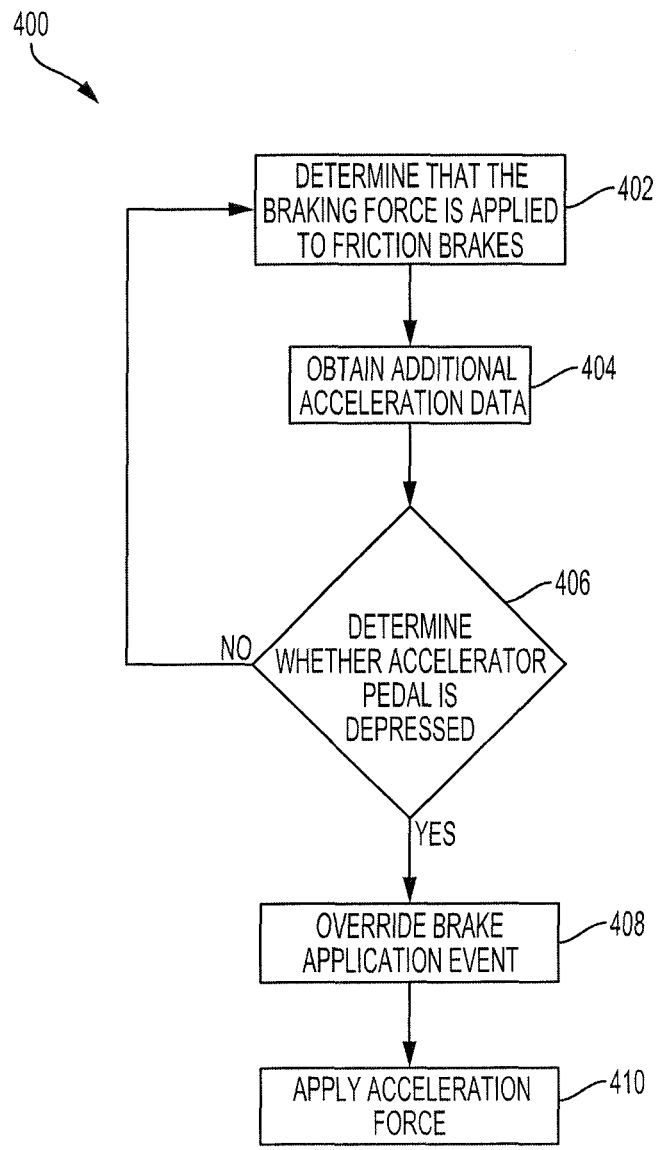
FIG. 4 is a flow diagram of an example process for overriding the brake application event according to an aspect of the invention.

FIG. 4 is a flow diagram of an example process 400 for overriding the brake application event. One or more computers or one or more data processing apparatuses, for example, the ECU 104 of the brake control system 100 of FIG. 1, appropriately programmed, may implement the process 400.

The brake control system 100 determines that a braking force is applied to the friction and/or hydraulic brakes without depression of the brake pedal 126 (402). The brake control system 100 may determine that the braking force is applied based on the brake indicator which may be activated when the brake control system 100 applied the braking force without depression of the brake pedal 126. In some implementations, one or more sensors 112 may detect if the braking force is being applied to the brakes 116 when the brake pedal 126 is not depressed.

The brake control system 100 obtains additional acceleration data from the acceleration input sensor (404). The additional acceleration data includes an indication that the accelerator pedal 128 has been depressed or an amount of depression of the accelerator pedal 128.

The brake control system 100 determines whether the accelerator pedal 128 is depressed based on the additional acceleration data (406). If the accelerator pedal is not depressed, the brake control system 100 continues to monitor for an override of the brake application event. If the accelerator pedal is depressed, the brake control system 100 overrides the brake application event (408). In response to the override of the brake application event, the brake control system 100 applies an acceleration force to move the vehicle 102 (410).

FIGS. 5A-5C show illustrations of use cases of when the brake control system 100 of FIG. 1 may be used to engage the friction and/or hydraulic brakes. FIG. 5A shows a vehicle 102 without the brake control system 100 at rest or stopped at a location 504. The vehicle 102 is at rest or stopped at the location 504 without depressing the brake pedal 126. The vehicle 102 may have come to a rest or stopped by using solely regenerative brakes or slowed to a stop when the momentum of the vehicle 102 stops. Another vehicle 502 impacts and collides with the vehicle 102. Since the driver of the vehicle 102 is not depressing the brake pedal 126 that engages the friction and/or hydraulic brakes, the vehicle 102 traverses a distance 506 that may result in the vehicle 102 being in the intersection.

FIG. 5B shows a vehicle 102 with the brake control system 100 at rest or stopped at a location 504. When the vehicle 102 detects that vehicle 502 is within a proximate distance 508, the vehicle 102 may determine that vehicle 502 will likely impact the vehicle 102. In response to determining that the vehicle 502 will likely impact the vehicle 102, the brake control system 100 of the vehicle 102 applies a braking force to the friction and/or hydraulic brakes. When the vehicle 502 impacts the vehicle 102 that has the braking force applied, the vehicle 102 may move a distance 510 that is less than the distance 506. The applied braking force prevents movement of the vehicle 102 or reduces the distance that the vehicle 102 is pushed or moved by the vehicle 502 when or after impact occurs.

FIG. 5C shows a vehicle 102 with the brake control system 100 at rest or stopped at a location 504 where the driver subsequently overrides the braking force. When the brake control system 100 determines that the vehicle 502 will impact the vehicle 102, the brake control system 100 determines that there is a brake application event and applies a braking force to the friction and/or hydraulic brakes. When the vehicle 502 impacts the vehicle 102 with the braking force applied, the vehicle 102 may move a distance 510. The driver may anticipate that the vehicle 102 may enter the intersection, and as a result, the driver may depress the accelerator pedal 128 to override the brake application event. When the driver depresses the accelerator pedal 128, the brake control system 100 overrides the brake application event and the vehicle 102 accelerates to traverse the distance 512.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A brake control system for a vehicle, comprising:
   a first sensor for detecting motion data of the vehicle; and
   an electronic control unit connected to the first sensor and configured to:
      determine that the vehicle is stopped based on the motion data,
      determine that a brake pedal of the vehicle is in a released position based on an amount of depression of the brake pedal,
      predict a brake application event that requires application of a braking force to prevent the vehicle from moving, and
      cause brakes of the vehicle to apply the braking force to prevent the vehicle from moving based on the brake application event.

2. The brake control system of claim 1, wherein the electronic control unit is configured to automatically cause the brakes of the vehicle to apply the braking force without depression of the brake pedal of the vehicle.

3. The brake control system of claim 2, further comprising:
   a user interface for displaying a user indicator; and
   wherein the electronic control unit is connected to the user interface and configured to display the user indicator that indicates that the brakes of the vehicle are being applied in response to the braking force being applied without depression of the brake pedal of the vehicle.

4. The brake control system of claim 1, further comprising:
   a second sensor for obtaining sensor data of an external environment surrounding the vehicle; and
   wherein the electronic control unit is configured to:
      obtain, from the second sensor, the sensor data, and
      predict the brake application event based on the sensor data.

5. The brake control system of claim 1, wherein the sensor data of the external environment surrounding the vehicle includes a distance between another vehicle and the vehicle, wherein the electronic control unit is configured to predict the brake application event when the distance between the another vehicle and the vehicle is less than a threshold distance that indicates that the another vehicle will impact the vehicle, and cause the brakes of the vehicle to apply the braking force in response to the prediction.

6. The brake control system of claim 1, further comprising:
   a second sensor for identifying a driver of the vehicle; and
   a memory configured to store driving behavior patterns of the driver;
   wherein an amount of the braking force applied to prevent the vehicle from moving is based on the stored driving behavior patterns of the driver.

7. The brake control system of claim 1, further comprising:
   an acceleration input sensor for obtaining additional acceleration data; and
   wherein the electronic control unit is configured to:
      obtain, from the acceleration input sensor, additional acceleration data that indicates that pressure is being applied to the accelerator pedal,
      override the brake application event,
      cause the brakes of the vehicle to release, and
      apply an acceleration force to move the vehicle.

8. The brake control system of claim 1, further comprising:
   a braking sensor for detecting the amount of depression of the brake pedal of the vehicle that is being applied;
   wherein the electronic control unit is configured to
   obtain, from the braking sensor, the amount of depression of the brake pedal that is being applied.

9. A brake control system for a vehicle, comprising:
   a brake sensor for detecting friction braking data including an indication of whether a brake pedal of the vehicle is depressed;
   at least one of a navigation unit or a first sensor for detecting vehicle data; and
   an electronic control unit configured to:
      obtain, from the brake sensor, braking data,
      determine that the brake pedal of the vehicle is not depressed based on the braking data,
      determine that the vehicle is not in motion based on the vehicle data, and
      automatically cause brakes of the vehicle to apply a braking force to prevent the vehicle from moving.

10. The brake control system of claim 9, wherein the electronic control unit is configured to automatically cause the brakes of the vehicle to apply the braking force until an acceleration input is received.

11. The brake control system of claim 9, further comprising:
    a second sensor for obtaining sensor data for an external environment surrounding the vehicle;
    wherein the electronic control unit is configured to:
       obtain, from the second sensor, the sensor data,
       predict a brake application event based on the sensor data, and
       automatically cause the brakes of the vehicle to apply the braking force based on the brake application event.

12. The brake control system of claim 9, wherein the electronic control unit is configured to automatically cause the brakes of the vehicle to apply the braking force without depression of the brake pedal of the vehicle.

13. The brake control system of claim 12, further comprising:
    a user interface for obtaining user input and displaying a user indicator;
    wherein the electronic control unit is connected to the user interface and configured to display the user indicator that indicates that the brakes of the vehicle are being applied without depression of the brake pedal of the vehicle.

14. The brake control system of claim 9, further comprising:
    a second sensor for identifying a driver of the vehicle; and
    a memory configured to store driving behavior patterns for the driver including an amount of pressure applied to the brakes of the vehicle;
    wherein an amount of the braking force applied to prevent the vehicle from moving is based on the stored driving behavior patterns for the driver.

15. The brake control system of claim 9, wherein to determine that the vehicle is not in motion based on the vehicle data the electronic control unit is configured to:
    obtain, from the at least one of the navigation unit or the first sensor, the vehicle data, wherein the vehicle data includes at least one of a position, speed or acceleration of the vehicle, and determine that the vehicle is not in motion based the position of the vehicle over a period of time, the speed or the acceleration of the vehicle.

16. The brake control system of claim 9, wherein the electronic control unit is configured to:
obtain, from the first sensor, acceleration data that indicates that pressure is being applied to the accelerator pedal,
override the automatic application of the brakes,
cause the brakes of the vehicle to release, and
apply an acceleration force to move the vehicle.

17. A method for controlling braking of the vehicle, comprising:
obtaining, from at least one of a navigation unit or a first sensor, movement information;
determining, by an electronic control unit, that the vehicle is stationary based on the movement information;
determining, by the electronic control unit, that a brake pedal of the vehicle is in a released position based on an amount of depression of the brake pedal;
determining, by the electronic control unit, that there is a brake application event that requires application of a braking force to prevent the vehicle from moving; and
controlling, by the electronic control unit, brakes of the vehicle to apply the braking force.

18. The method of claim 17, further comprising:
obtaining, by a second sensor, sensor data that includes a measurement of a distance between a rear of the vehicle and an approaching vehicle;
determining, by the electronic control unit, that the approaching vehicle will impact the vehicle when the distance between the rear of the vehicle and the approaching vehicle is less than a threshold distance; and
determining, by the electronic control unit, that there is the brake application event in response to determining that the approaching vehicle will impact the vehicle.

19. The method of claim 17, wherein controlling the brakes of the vehicle to apply the braking force includes sending a signal to the brakes to apply the braking force automatically and without depression of the brake pedal.

20. The method of claim 17, further comprising displaying, on a user interface, an indicator that indicates that the brakes are being applied automatically and without depression of the brake pedal of the vehicle.

* * * * *